US008275573B1

(12) United States Patent
Schmit et al.

(10) Patent No.: US 8,275,573 B1
(45) Date of Patent: Sep. 25, 2012

(54) LARGE-SURFACE DEFECT DETECTION BY SINGLE-FRAME SPATIAL-CARRIER INTERFEROMETRY

(75) Inventors: Joanna Schmit, Tucson, AZ (US); Florin Munteanu, Tucson, AZ (US)

(73) Assignee: Bruker Nano, Inc., Santa Barbara, CA (US)

( * ) Notice: Subject to any disclaimer, the term of this patent is extended or adjusted under 35 U.S.C. 154(b) by 403 days.

(21) Appl. No.: 12/624,284

(22) Filed: Nov. 23, 2009

(51) Int. Cl.
*G04F 1/00* (2006.01)
*G01B 11/00* (2006.01)
*G01B 11/02* (2006.01)

(52) U.S. Cl. ........ 702/167; 356/511; 356/512; 356/513; 356/514

(58) Field of Classification Search .................. 702/167; 356/511–514
See application file for complete search history.

(56) References Cited

U.S. PATENT DOCUMENTS

2009/0182528 A1\* 7/2009 De Groot et al. ............. 702/167

\* cited by examiner

*Primary Examiner* — Janet Suglo
(74) *Attorney, Agent, or Firm* — Antonio R. Durando (57) ABSTRACT

An adaptive algorithm is tailored to fit the local fringe frequency of single-frame spatial-carrier data under analysis. Each set of data points used sequentially by the algorithm is first processed with a Fourier Transform to find the local frequency of the fringes being analyzed. That information is then used to adapt the algorithm to the correct phase step thus calculated, thereby optimizing the efficiency and precision with which the algorithm profiles the local surface area. As a result, defects are identified and measured with precision even when the slope of the surface varies locally to the point where the algorithm without adaptive modification would not be effective to measure them. Once so identified, the defects may be measured again locally with greater accuracy by conventional temporal PSI.

30 Claims, 6 Drawing Sheets

ACQUIRE SPATIAL-CARRIER INTERFEROGRAM DATA FROM THE SAMPLE SURFACE

SELECT A PROCESSING ALGORITHM FOR PROFILING THE SAMPLE SURFACE BASED ON A PREDETERMINED EXPECTED SIZE OF SURFACE DEFECTS

CALCULATE A FRINGE FREQUENCY FROM A SET OF SAID INTERFEROGRAM DATA

USE THE FRINGE FREQUENCY SO CALCULATED TO ADAPT THE PROCESSING ALGORITHM TO CONFORM TO THE FRINGE FREQUENCY OF THE SET OF INTERFEROGRAM DATA

PROCESS THE INTERFEROGRAM DATA TO PRODUCE A PROFILE OF THE SAMPLE SURFACE BY REPEATING THE CALCULATION AND ALGORITHM ADAPTATION STEPS FOR SUCCESSIVE SETS OF INTERFEROGRAM DATA

ACQUIRE SPATIAL-CARRIER INTERFEROGRAM DATA
FROM THE SAMPLE SURFACE

↓

SELECT A PROCESSING ALGORITHM FOR PROFILING
THE SAMPLE SURFACE BASED ON A PREDETERMINED
EXPECTED SIZE OF SURFACE DEFECTS

↓

CALCULATE A FRINGE FREQUENCY FROM A SET OF
SAID INTERFEROGRAM DATA

↓

USE THE FRINGE FREQUENCY SO CALCULATED TO
ADAPT THE PROCESSING ALGORITHM TO CONFORM TO
THE FRINGE FREQUENCY OF THE SET OF
INTERFEROGRAM DATA

↓

PROCESS THE INTERFEROGRAM DATA TO PRODUCE A
PROFILE OF THE SAMPLE SURFACE BY REPEATING THE
CALCULATION AND ALGORITHM ADAPTATION STEPS
FOR SUCCESSIVE SETS OF INTERFEROGRAM DATA

FIG. 5

CALCULATE A FRINGE FREQUENCY $F$ FROM A SET OF
INTERFEROGRAM DATA

↓

USE THE FRINGE FREQUENCY $F$ SO CALCULATED TO
SOLVE FOR $a_{-2}$, $a_{-1}$, $a_0$, $a_1$ AND $a_2$ THE SYSTEM OF EQUATIONS $$\begin{cases} a[0]=1 \\ a[-1]=a[1]=\dfrac{-1-\cos(2\pi F)}{1+2\cos(2\pi F)} \\ a[-2]=a[2]=\dfrac{1}{2[1+2\cos(2\pi F)]} \\ b[-2]=b[-1]=b[0]=b[1]=b[2]=0 \end{cases}$$

↓

FIND THE PHASE $\varphi$ CORRESPONDING TO THE SET OF
INTERFEROGRAM DATA FROM THE EQUATION $$\varphi = \mp\arg[S(\varphi)] = \mp\arg\left[\sum_n (a[n]+ib[n])\exp(\mp i2\pi Fn)I[n]\right]$$
( $n = \{-2,-1,0,1,2\}$ )

↓

PROCESS THE INTERFEROGRAM DATA TO PRODUCE A PROFILE
OF THE SAMPLE SURFACE BY REPEATING THE FRINGE
CALCULATION AND ALGORITHM ADAPTATION STEPS FOR
SUCCESSIVE SETS OF INTERFEROGRAM DATA

LARGE-SURFACE DEFECT DETECTION BY SINGLE-FRAME SPATIAL-CARRIER INTERFEROMETRY

BACKGROUND OF THE INVENTION

1. Field of the Invention

The invention relates in general to interferometric profilometry for surface characterization. In particular, it relates to a new approach for rapidly identifying defects on a large sample surface using an adaptive algorithm and single-frame interferometric data.

2. Description of the Related Art

Interferometric profilers have become standard instruments for quality control in the manufacture of many high-precision commercial products. In particular, the ability to inspect large panels (in the order of 60×60 cm$^2$) of plastic substrates rapidly and with nanometer vertical accuracy to identify and characterize defects is critical to the production flow of printed electronics. In particular, for quality-control purposes it is important to distinguish between defects based on their height. Therefore, the identification and characterization of each defect is important. Conventional optical surface profilometry enables the performance of non-contact measurement of small objects with high vertical and lateral resolution and at relatively high measurement speeds. However, the measurement of large objects with current techniques is not fast enough for inline applications.

Widely accepted, conventional techniques are available for calculating surface topography from optical interference data. Phase-shifting interferometry (PSI), for example, is based on changing the phase difference between two coherent interfering beams at a single wavelength, $\lambda$, in some known manner, such as by changing their optical path difference (OPD) either continuously or discretely with time. Several measurements of light irradiance with different OPD values, usually equally spaced, at a pixel of a photodetector can be used to determine the phase difference between the interfering beams at the point on a test surface corresponding to that pixel. Based on such measurements at all pixels with coordinates (x,y), a phase map $\Phi(x,y)$ of the test surface can be obtained, from which very accurate data about the surface profile may be produced using well known algorithms.

PSI provides vertical resolution in the order of $1/1000$ of a wavelength or better; thus, it is well suited for characterizing smooth, well-reflecting surfaces and for identifying nano-size defects (in height) on a flat surface. At the same time, the PSI technique has a limited vertical range of application because of the so-called $2\pi$ ambiguity, which complicates the measurement when the surface features are higher than $\lambda/2$. Thus, in practice, conventional PSI techniques have been limited to the measurement of fairly smooth and continuous surfaces. When the objective of the measurement is the rapid detection of small defects in a large sample surface, conventional PSI is also limited by its intensive speed requirements for sample scanning and data acquisition.

Large-step, rough, or steep-surface measurements have been traditionally carried out with white-light (or broadband-light) vertical-scanning interferometry (VSI). However, with respect to the rapid defect-detection objective of the present invention, even greater speed limitations than PSI's apply to VSI. In addition, VSI's vertical resolution may sometime be insufficient to measure very small defects.

Thus, in order to speed up the measurement and produce meaningful results rapidly when a large sample surface is involved, the present invention adopts a single-frame raster-type approach for scanning the surface and a spatial-carrier method of analysis for processing the interferometric data collected during the scan. By introducing a tilt between the sample surface and the reference surface, each frame provides a set of fringes spaced apart according to the OPD produced by the tilt. If the sample surface were sufficiently flat to produce a reasonably uniform spacing between fringes, each frame could be analyzed using conventional PSI or Fourier Transform (FT) algorithms. For instance, when the tilt in the surface corresponds to fringes produced by a 90-degree phase change between adjacent detector pixels (the spatial phase step), a conventional 90-degree PSI algorithm applied to consecutive pixels may be used effectively to profile the surface and identify defects. Any discontinuity in the fringes will correspond to a discontinuity in the smooth surface profile (i.e., a defect) that can thus be identified and measured using the conventional temporal PSI algorithm. A similar analysis can be carried out with standard FT algorithms (see, for example, Mitsuo Takeda et al., "*Fourier-transform method of fringe-pattern analysis for computer-based topography and interferometry*," JOSA, Vol. 72, Issue 1, pp. 156-160).

Inasmuch as the tilt between a smooth surface and the reference surface can be controlled to produce the desired spatial phase step to match a particular algorithm selected for analysis, this single-frame approach is theoretically sound for finding defects rapidly and fairly accurately in large surface areas using conventional PSI or FT algorithms. However, all PSI algorithms are based on the information provided by a fixed number of consecutive irradiance data points acquired from the sample (at least three; typically five or eight). The most appropriate algorithm is selected according to the phase step expected between data points and a constant phase step is assumed.

As a result of the consecutive multiple data points used in a frame, PSI-type algorithms tend to smooth the phase information produced from the data acquired from the sample and the smoothing effect is greater when a larger number of points is used. This effect is even more pronounced with FT algorithms. Therefore, surface defects that involve very small areas, such as spots corresponding to one or two pixels of the detector, may be smoothed out and remain undetected if the wrong PSI algorithm is used with single-frame spatial-carrier data. Furthermore, even if the correct algorithm is selected for the particular defects expected to be found in a given sample, the effectiveness of the algorithm, which is founded on the presumption that fringes are produced by a constant phase step that is known a priori, is greatly undermined by slope variations normally present in the sample surface. Therefore, an unacceptable defect may go undetected or may be overlooked for further evaluation because the PSI algorithm is ineffective for the local changes in phase step size even though appropriately selected for the size of the defect.

In view of the foregoing, conventional single-frame spatial-carrier measurements, though rapid and potentially very advantageous for measuring large objects, are not effective for defect detection in large samples that are not perfectly flat. The present invention is directed at providing a solution to this problem.

BRIEF SUMMARY OF THE INVENTION

The single-frame spatial-carrier method of the invention is based on the use of an adaptive algorithm tailored to fit the local spatial fringe frequency of the data being processed. As a result, the best form of algorithm is used at each step of the calculation to ensure an accurate local measurement. Thus, if the selected algorithm is appropriate to avoid smoothing of the defects expected to be found in the sample, such defects will be identified even when the sample surface is not flat and its slope does not conform to the tilt introduced for the measurement. Once so identified, the defects may be measured again locally with greater accuracy by conventional vertical-scan (temporal) PSI.

The objective of the invention is the rapid identification of defects in large samples, such as plastic panels used in electronic components. These samples are not perfectly flat and may be marred by manufacturing defects of a nature and size that are generally known. Therefore, it is possible to select a suitable algorithm that utilizes a number of data points that is large enough to see the defect but not so large as to hide it by its smoothing effect. The selection of such suitable algorithm is not part of the normal process of conventional PSI analysis because in temporal PSI the smoothing effect of the algorithm does not affect lateral resolution. However, it is critical for resolution in spatial PSI, a fundamental requirement for the objectives of the present invention.

As done conventionally for spatial-carrier interferometry, the angle between the large sample surface and the reference mirror is set to the degree necessary to produce the best average spatial frequency for the PSI algorithm selected for the measurement. The surface is then scanned in some manner, preferably in raster fashion for speed and coverage, to acquire multiple single-frame interferograms. The data points of each interferogram are used in conventional manner to profile the corresponding surface section using the selected algorithm, thus rapidly identifying unexpected irregularities that may correspond to defects. According to the invention, each set of data points (or a representative sample thereof) used sequentially by the algorithm is first processed with a Fourier Transform (or any other equivalent method, such as a fringe counting method or one of the various spectral methods well documented in the literature, like MUSIC™ or ESPRIT®, for example) in order to find the local frequency of the fringes being analyzed. That information is then used to adapt the PSI algorithm to the correct phase step thus calculated, thereby optimizing the efficiency and precision with which the selected algorithm profiles the local surface area. As a result, defects are identified even when the slope of the surface varies locally to the point where the algorithm without adaptive modification would not be effective to measure them.

The adaptive modification of the invention is based on the recognition that conventional PSI algorithms are not designed to cope with continuously variable fringe frequency and thus they are prone to produce incorrect surface characterization. In essence, together with the dynamic fringe frequency determination, the present invention teaches an optimal procedure for building the best PSI algorithm corresponding to a given frequency in the data being processed.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE PREFERRED EMBODIMENT OF THE INVENTION

The idea of the invention is to modify the PSI algorithm used for single-frame spatial-carrier analysis in order to adapt it to the local slope conditions of the sample surface. This optimizes the performance of the algorithm, which is tied to the spatial fringe frequency of the interferogram being measured, and therefore enables the detection of defects that would otherwise remain undetected. As a result, the single-frame approach becomes suitable for defect detection and its greater speed makes it possible to measure large samples in much more rapid fashion than with conventional vertical-scan (temporal) approaches (PSI or VSI). Once so identified, if a more precise measurement of the defect is needed, a conventional vertical-scan measurement may be performed with data acquired with a separate local scan at a higher magnification. For the purposes of the invention, as described and claimed, the terms correlogram and interferogram are used interchangeably and are intended to cover any fringe pattern used for profilometry and shape measurements, including non-interferometric methods such as fringe projection and Moire fringes.

Figure 1:
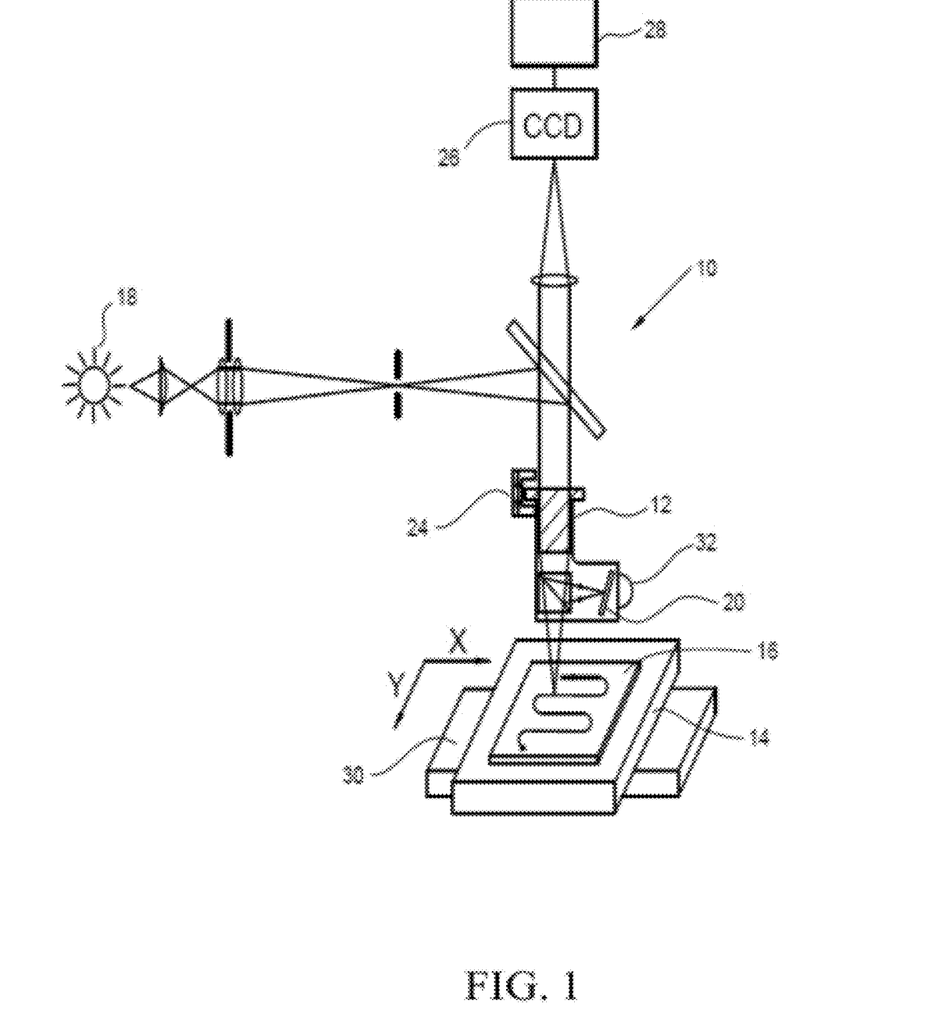
FIG. 1 is a schematic illustration of a conventional interferometer modified for testing a large sample surface according to the invention.

Thus, the invention may be practiced with a conventional Z-scanning interferometer 10 with a microscope objective 12 or a sample stage 14 capable of X and Y relative translation, such as in serpentine or raster fashion, to acquire images of adjacent portions of a sample surface 16. As used herein, X and Y refer to the plane coordinates of the test surface and Z to the direction normal thereto. The interferometer comprises a light source 18 illuminating a reference mirror 20 and the sample surface 16 through the microscope objective 12. A suitable focusing mechanism 24 is provided to track the height changes of the sample surface as the objective scans it so as to keep the sample in focus during the X-Y scan. Combining the light beams generated in reflection from the mirror and the sample surface, interference fringes are produced as a result of the optical path difference between the two beams generated by the vertical scan. A detector 26 (typically a charge-coupled device "CCD" camera) and appropriate electronic components 28 are provided to acquire and transmit digitized irradiance data and for further processing by electronic apparatus, such as computers and image display devices.

For the purposes of the present invention the conventional interferometer is equipped with a sample stage 14 sufficiently large to accommodate the sample of interest and with an X-Y scanner 30 adapted to cover the entire surface of the sample in some manner so that single-image data of the sample may be acquired. The interferometer is equipped with a tip/tilt mechanism 32 to introduce a predetermined angle of incidence on the beam illuminating the sample surface or the reference surface, as illustrated, so as to produce fringes of a certain frequency deemed optimal for the particular PSI algorithm used for analysis of the interferograms. It is understood that angle of incidence may be varied by tilting the optical head, the reference mirror, and/or the objective.

According to the invention, the sample is first scanned in the X-Y plane to acquire single-frame images of different portions of the surface at a relatively low magnification, such as 5×. Typically the field of view will be in the order of 1×1 mm$^2$ and the sample surface up to 600×600 mm$^2$; therefore, many thousand single images are required to cover the entire surface, which illustrates the need for an effective profiling technique capable of rapid application during the scan. The magnification used (or, in the case of very small defects, the numerical aperture of the objective) is determined based on the nature of the defects and the correspondingly required lateral resolution). Thus, based on a priori knowledge about the expected size of the defects to be encountered on the sample of interest, a PSI algorithm capable of identifying them with the available resolution is judiciously selected and used to analyze each interferogram frame acquired during the scan. For example, a five-point algorithm may be used for a presumed 90-degree phase-shift-per-pixel tilt. However, as mentioned above, local variations in the slope of the sample surface may change the fringe frequency to the point where the effectiveness of the chosen algorithm is impaired and materially incorrect results are obtained.

To overcome this problem, the invention adopts the approach of calculating the spatial fringe frequency for each set of "N" data points being processed by the algorithm. This is done, for example, by using conventional Fourier Transform analysis. The fringe frequency so determined is then used to adapt the algorithm for optimal performance at that local frequency. This step is repeated on a recurring basis locally as the algorithm processes each new set of N data points in each correlogram being analyzed. As a result, the algorithm maintains the degree of precision necessary to resolve small surface irregularities regardless of the actual local slope of the sample surface. Once such irregularities are identified by this initial, rapid scan, they can then be measured with at a higher magnification and a higher degree of accuracy, if necessary, by performing conventional Z-scan PSI (or VSI) only at the location of the defect.

Figure 2:
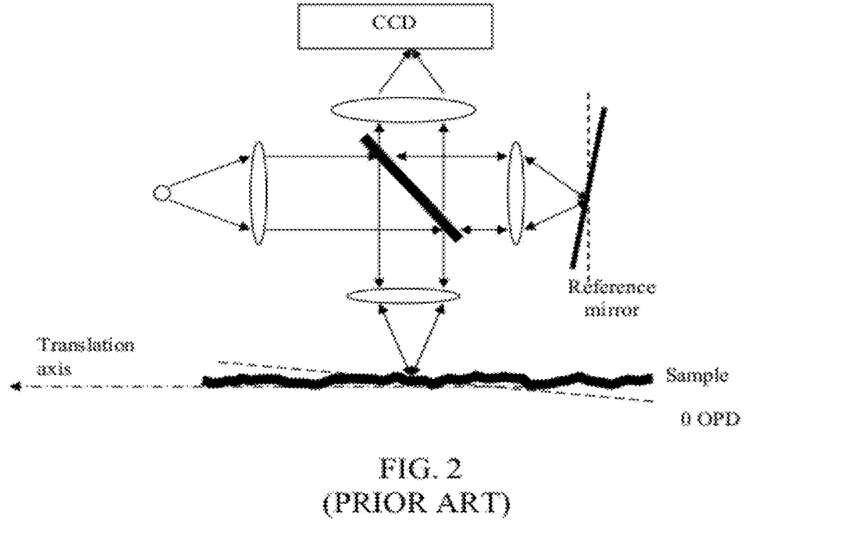
FIG. 2 is an illustration of the sample tilt introduced to perform spatial-carrier interferometry.
Figure 3:
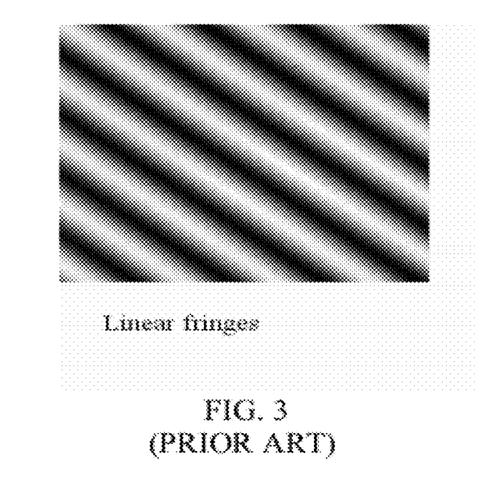
FIG. 3 is an example of linear fringes produced by a substantially flat surface.
Figure 4:
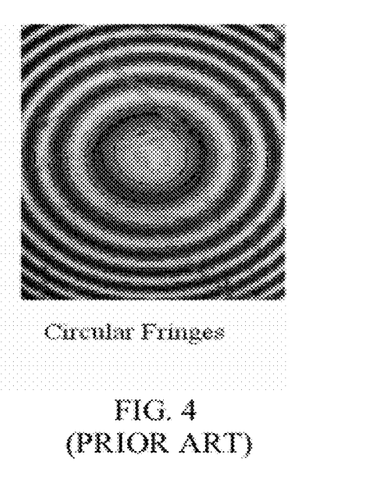
FIG. 4 is an example of circular fringes produced by a substantially spherical surface.

The adaptive algorithm of the invention is developed as follows. The surface under investigation is slightly tilted with respect to the plane of zero OPD position (determined by the reference mirror position), as illustrated in FIG. 2, and a single snapshot of the interferometric signal coming from the sample and the reference mirror is recorded by a CCD camera. The profile of the sample can then be recovered conventionally by analyzing the phase of the fringes produced by the tilt. The shape and frequency of the fringes is strongly dependent upon the tilt angle between the surface and the reference mirror as well as upon the shape of the surface itself. In the case when the surface is flat, linear fringes with constant frequency will be obtained on the CCD, as illustrated in FIG. 3. In the case of a spherical surface, circular fringes with variable frequency are seen, as shown in FIG. 4. In order to determine the surface profile at every point, the interference figure is preferably analyzed in a direction perpendicular to the fringes.

Thus, the invention is practiced according to the protocol outlined below.

1. Determine the direction perpendicular to the fringes seen in the interferogram. When the surface does not deviate much from planarity, this direction is preferably the direction where the angle with respect to the zero OPD line is largest.

2. Along each line parallel to such selected direction, identify all possible groups of N contiguous pixels for processing by a N-point algorithm. In general, the value of N is selected in such a way that it offers the best compromise between correct shape/defect detection and noise attenuation. More pixels tend to lower the noise in calculating the surface profile but also tend to overlook small defects. A small value of N will be more sensitive to defects of small spatial size but it will also be more affected by the overall noise in the image. A good value for N is usually between 5 and 8.

3. Determine the spatial fringe frequency for each set of N consecutive pixels. This can be done on the fly, as the algorithm processes consecutive sets of N data points with a moving window, or as a separate determination.

4. Generate and apply the best algorithm for the frequency so determined for the current set of N pixels (i.e., adapt the chosen N-point algorithm by calculating optimal coefficients for the fringe frequency of the set of N data points under consideration).

The strategy employed in building the adaptive algorithm of the invention is best explained by the examples that follow. In general, the irradiance of the signal can be written for each pixel as:

$$I(x[n]) = DC + V\cos[\alpha(x[n]) + \varphi + \varepsilon(x[n])] = DC + \frac{V}{2}\exp\{i[\alpha(x[n]) + \varphi + \varepsilon(x[n])]\} + \frac{V}{2}\exp\{-i[\alpha(x[n]) + \varphi + \varepsilon(x[n])]\} \quad (1)$$

where the quantity of interest is the phase $\varphi$. "x[n]" is the position of the pixel with respect to a common origin along the straight line represented by the N pixels, "DC" represents the DC component of the signal, "V" represents the amplitude of the AC component and "$\varepsilon$" represents unknown random errors that vary from pixel to pixel. The quantity "$\alpha(x[n])$" is, in general, a linear function of x[n] and is proportional to the signal frequency. For example, when the distance between consecutive pixels is $\Delta x$ and the wavelength used in the measurements is $\lambda$, the following holds true:

$$\alpha(x[n]) = \frac{4\pi\Delta x}{\lambda\tan(u)}n \equiv 2\pi Fn \quad (2)$$

$$F \equiv \frac{2\Delta x}{\lambda\tan(u)}$$

In these expressions, the value "u" represents the angle between the reference mirror and the direction of motion of the sample and it is known a priori. When u also corresponds to the angle of the line passing through the N pixels being processed (i.e., the tilt angle is also reflected locally), the frequency F flows from the set of Equations 2. Using, for example, a tilt that produces a spatial angular frequency F of about $\pi/2$ (i.e., a 90-degree angular frequency), standard algorithms exist such that the phase value $\varphi$ may be determined by the general expression:

$$\tan(\varphi) = \frac{\sum a[n]I[n]}{\sum b[n]I[n]} \quad (3)$$

where the coefficients "a" and "b" are calculated a priori and optimized for a 90-degree angular frequency. See, for example J. Schmit and K. Creath, "Extended Averaging Technique for Derivation of Error-Compensating Algorithms in Phase-Shifting Interferometry," Appl. Opt., Vol 34 (19), pp. 3610-3619 (July 1995).

However, because of surface irregularities, the local value of the frequency F is not well known a priori. Therefore, the first step in adapting an algorithm to the local conditions according to the invention is to determine the frequency F of the N pixels being processed by performing a Discrete Fourier Transform (DFT), preferably with a zero-padded signal for better resolution and accuracy. Once the frequency has been so determined, the best set of complex coefficients "A[n]" matching this frequency is calculated by adopting, for simplicity, a phase functionality expressed by the quantity:

$$S(\varphi) \equiv \sum_n A[n] I(x[n]), \tag{4}$$

which, in order to enable the determination of the phase φ, from Equation 1 must have the property:

$$S(\varphi) \propto \exp(\pm i\varphi). \tag{5}$$

Further inspection of the form of Equation 1 leads to the conclusion that Equation 5 can be satisfied if and only if either one of the following systems is satisfied:

$$\begin{cases} DC \sum_n A[n] = 0 \\ \dfrac{V\exp(i\varphi)}{2} \sum_n A[n]\exp\{i[2\pi Fn + \varepsilon(x[n])]\} = 0 \end{cases} \tag{6}$$

$$S(\varphi) = \frac{V\exp(-i\varphi)}{2} \sum_n A[n]\exp\{-i[2\pi Fn + \varepsilon(x[n])]\}$$

or $$\begin{cases} DC \sum_n A[n] = 0 \\ \dfrac{V\exp(-i\varphi)}{2} \sum_n A[n]\exp\{-i[2\pi Fn + \varepsilon(x[n])]\} = 0 \end{cases}$$

$$S(\varphi) = \frac{V\exp(i\varphi)}{2} \sum_n A[n]\exp\{i[2\pi Fn + \varepsilon(x[n])]\}.$$

It is clear that in either case the expression for S(φ) will involve an additional fixed phase factor introduced by the summation. Since in measuring the shape of the sample only the relative position of the surface points is of interest, such additional term will have no significance for the purpose of mapping the surface. If, however, the exact phase of the signal must be determined for some reason, the additional fixed phase factor can be easily determined from the equations above.

Assuming that the values of DC and V are not zero (an assumption that conforms to the conditions during sampling), the two systems of Equations 6 written above can be simplified to:

$$\begin{cases} \sum_n A[n] = 0 \\ \sum_n A[n]\exp\{\pm i[2\pi Fn + \varepsilon(x[n])]\} = 0, \end{cases} \tag{7}$$

which can be further simplified by expressing the exponential term involving the unknown quantities ε(x[n]) in polynomial form. Based on the Weirstrass theorem (which states that each function can be approximated infinitely well by polynomials), it is possible to write (considering x[n] and ε(x[n]) as a variable and an arbitrary function, respectively):

$$\exp[\pm i\varepsilon(x[n])] = \tag{8}$$
$$\cos[\varepsilon(x[n])] + i\sin[\varepsilon(x[n])] \cong \sum_{k=0} p[k]x[n]^k \pm i\sum_{k=0} q[n]x[n]^k,$$

where p[k] and q[k] are unknown coefficients. Considering now that the values of x[n] are uniformly distributed within the interval Δx (such that x[n]=nΔx) and neglecting the common offset from the origin, it is possible to write:

$$\exp[\pm i\varepsilon(x[n])] \cong \sum_{k=0} p[k]n^k \pm i\sum_{k=0} q[n]n^k, \tag{9}$$

where the value of Δx has been tacitly incorporated into the definition of the unknown coefficients p[k] and q[k]; and the value of n is not necessarily integer, but successive values of n are separated by a single unit (for example, a possible selection of values for n can be {−½, +½, +3/2, ... }).

Using Equation 9, the system of Equations 7 can be then written as:

$$\begin{cases} \sum_n A[n] = 0 \\ \sum_n A[n]\exp(\pm i2\pi Fn)\left[\sum_{k=0} p[k]n^k \pm i\sum_{k=0} q[k]n^k\right] = 0. \end{cases} \tag{10}$$

Based on the fact that p[k] and q[k] are independent random variables, it is possible to simplify the solution of the system by selecting the condition when each pair of coefficient p[k] and q[k] cancels independently. The system of Equations 10 then becomes $$\begin{cases} \sum_n A[n] = 0 \\ \sum_n A[n]\exp(\pm i2\pi Fn)n^k = 0 \quad k = 0, 1 \ldots ; \end{cases} \tag{11}$$

where k in theory is as large as infinity but in practice is judiciously selected so as to produce a number of system equations no larger than the number of unknown variables (so that the system can be solved).

For convenience of notation, the following additional change of variables is performed:

$$C[n] = A[n]\exp(\pm i2\pi Fn) \Leftrightarrow A[n] \equiv C[n]\exp(\mp i2\pi Fn), \tag{12}$$

such that the system (11) can be written as:

$$\begin{cases} \sum_n C[n]\exp(\mp i2\pi Fn) = 0 \\ \sum_n C[n]n^k = 0 \qquad k = 0, 1 \ldots \end{cases} \tag{13}$$

which reduces the problem to determining the values of the coefficients C[n] that satisfy these two equations. In the most general case, the coefficients C[n] can have the complex form:

$$C[n] = a[n] + ib[n] \Rightarrow A[n] \equiv (a[n] + ib[n])\exp(\mp i2\pi Fn). \tag{14}$$

Accordingly, the system of Equations 13 becomes:

$$\begin{cases} \sum_n a[n]\cos(2\pi Fn) \pm b[n]\sin(2\pi Fn) = 0 \\ \sum_n a[n]\cos(2\pi Fn) \mp b[n]\sin(2\pi Fn) = 0 \\ \sum_n a[n]n^k = 0 \qquad k = 0, 1 \ldots \\ \sum_n b[n]n^k = 0 \qquad k = 0, 1 \ldots \end{cases} \quad (15)$$

Once the values of a[n] and b[n] are calculated from the system of Equations 15, the phase co corresponding to the location being processed can be determined in straightforward manner from the usual arctangent relation:

$$\varphi = \mp\arg[S(\varphi)] = \mp\arg\left[\sum_n (a[n] + ib[n])\exp(\mp i2\pi Fn)I[n]\right]. \quad (16)$$

As mentioned before, if the exact value of the signal's phase is required (as in the case of Single Frame Interferometry), the value obtained from Equation 16 is corrected by subtracting the phase of the expression:

$$\sum_n A[n]\exp(\mp i2\pi Fn) = \sum_n (a[n] + ib[n])\exp(\mp i4\pi Fn) \quad (17)$$

An important simplification in the system of Equations 15 can be obtained by selecting values of n that are symmetrical with respect the origin. For example, in the case when an odd number of points (2N+1) is considered, the values for n should be n={−N, −N+1 ... 0 ... N}. When an even number of points (2N) is considered, the values for n should be $$n = \left\{-N + \frac{1}{2}, -N + \frac{3}{2}, \ldots -\frac{1}{2}, \frac{1}{2} \ldots N - \frac{1}{2}\right\}.$$

Together with appropriate symmetry conditions for the coefficients a[n] and b[n], $$\begin{cases} a[-n] = \pm a[n] \\ b[-n] = \pm b[n] \end{cases} \quad (18)$$

the last two equations will become an identity for all odd (or even) values of k.

Thus, the set of Equations 15 and 16 can be easily used according to the invention to generate optimal algorithms for any signal frequency F. Inasmuch as the a[n] and b[n] coefficients represent real and complex components of the equations, their solution may be simplified by selecting the case when b[n]=0. Examples are given below explicitly for such case.

Using a Five-Point Algorithm, in the case when b[n]=0 the system of Equations 15 becomes:

$$\begin{cases} \sum_n a[n]\cos(2\pi Fn) = 0 \\ \sum_n a[n]n^k = 0 \qquad k = 0, 1 \ldots \end{cases} \quad (19)$$

If the values of n are selected symmetrically around 0 (n={−2, −1, 0, 1, 2}) and if a[n] is set to be even, a[n]=[−n] then the second equation becomes a true identity for all values of k that are odd. The system then becomes:

$$\begin{cases} a[0] + 2a[1]\cos(2\pi F) + 2a[2]\cos(4\pi F) = 0 \\ a[0] + 2a[1] + 2a[2] = 0, \end{cases} \quad (20)$$

which is easily solved to yield:

$$\begin{cases} a[1] = \dfrac{a[0][1 - \cos(4\pi F)]}{2[\cos(4\pi F) - \cos(2\pi F)]} \\ a[2] = \dfrac{a[0][\cos(2\pi F) - 1]}{2[\cos(4\pi F) - \cos(2\pi F)]}. \end{cases} \quad (21)$$

Since the value of a[0] is arbitrary, choosing a[0]=1 will produce the following general solution after simple trigonometric manipulation:

$$\begin{cases} a[0] = 1 \\ a[-1] = a[1] = \dfrac{-1 - \cos(2\pi F)}{1 + 2\cos(2\pi F)} \\ a[-2] = a[2] = \dfrac{1}{2[1 + 2\cos(2\pi F)]} \\ b[-2] = b[-1] = b[0] = b[1] = b[2] = 0 \end{cases} \quad (22)$$

The equations for a larger number of data points may be formulated in a similar manner. For a Six-Point Algorithm, for example, the coefficients are determined to be:

$$\begin{cases} a\left[-\dfrac{5}{2}\right] = -a\left[\dfrac{5}{2}\right] = 1 \\ a\left[-\dfrac{3}{2}\right] = -a\left[\dfrac{3}{2}\right] = -3 - 2\cos(2\pi F) \\ a\left[-\dfrac{1}{2}\right] = -a\left[\dfrac{1}{2}\right] = 2[2 + 3\cos(2\pi F)] \\ b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = b\left[\dfrac{5}{2}\right] = 0 \end{cases} \quad (23)$$

For a Seven-Point Algorithm, the coefficients are similarly determined to be:

$$\begin{cases} a[-3] = a[3] = 1 \\ a[-2] = a[2] = -2[2 + \cos(2\pi F)] \\ a[-1] = a[1] = 7 + 8\cos(2\pi F) \\ a[0] = -4[2 + 3\cos(2\pi F)] \\ b[-3] = b[-2] = b[-1] = b[0] = b[1] = b[2] = b[3] = 0 \end{cases} \quad (24)$$

Finally, a similar manipulation for an Eight-Point Algorithm yields:

$$a\left[-\frac{7}{2}\right] = -a\left[\frac{7}{2}\right] = -1 \quad (25)$$

$$a\left[-\frac{5}{2}\right] = -a\left[\frac{5}{2}\right] = 5 + 2\cos(2\pi F)$$

$$a\left[-\frac{3}{2}\right] = -a\left[\frac{3}{2}\right] = -11 - 10\cos(2\pi F)$$

$$a\left[-\frac{1}{2}\right] = -a\left[\frac{1}{2}\right] = 5[3 + 4\cos(2\pi F)]$$

$$b\left[-\frac{7}{2}\right] = b\left[-\frac{5}{2}\right] = b\left[-\frac{3}{2}\right] = b\left[-\frac{1}{2}\right] = b\left[\frac{1}{2}\right] = b\left[\frac{3}{2}\right] = b\left[\frac{5}{2}\right] = b\left[\frac{7}{2}\right] = 0$$

Figure 5:
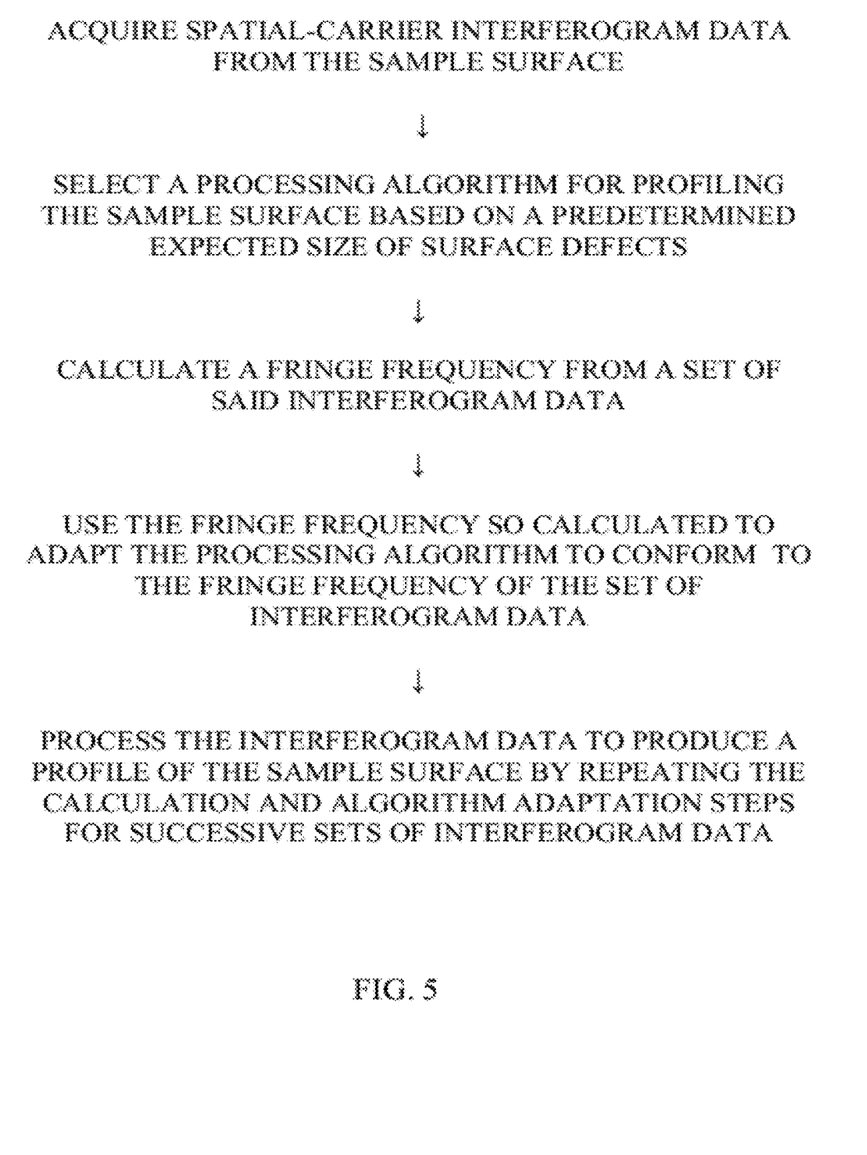
FIG. 5 is a flow-chart of the general approach of the invention.
Figure 6:
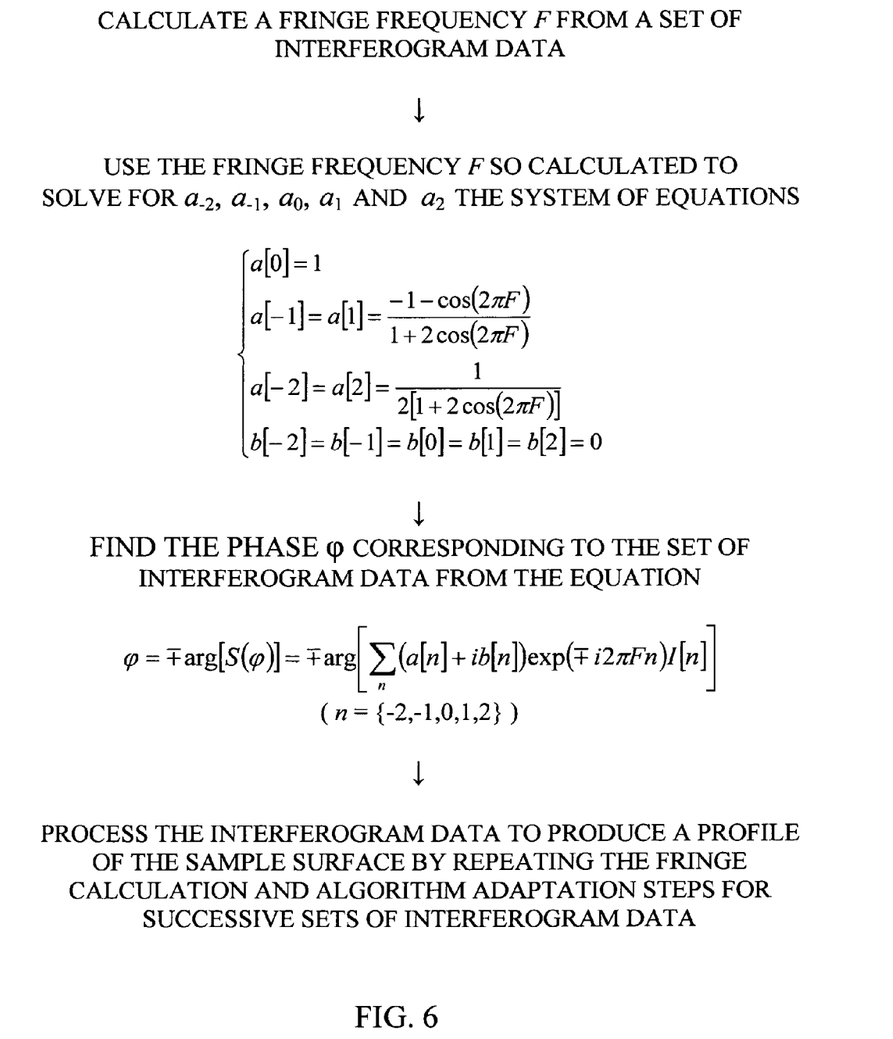
FIG. 6 is a flow-chart of the adaptive algorithm of the invention as applied to a five-point PSI algorithm.

FIG. 5 is a flow-chart of the general approach of the invention. FIG. 6 is a flow-chart of the steps involved at each iteration of algorithm adaptation for a five-point algorithm.

Figure 7:
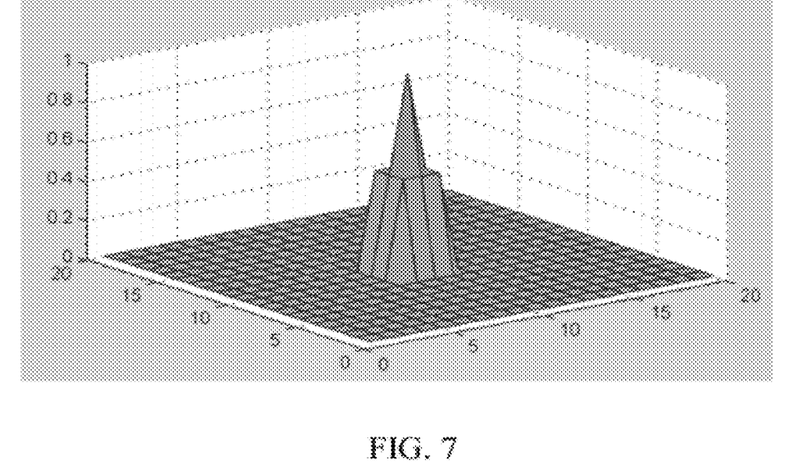
FIG. 7 is the simulated height map of a portion of a sample surface containing a defect of known dimensions.
Figure 9:
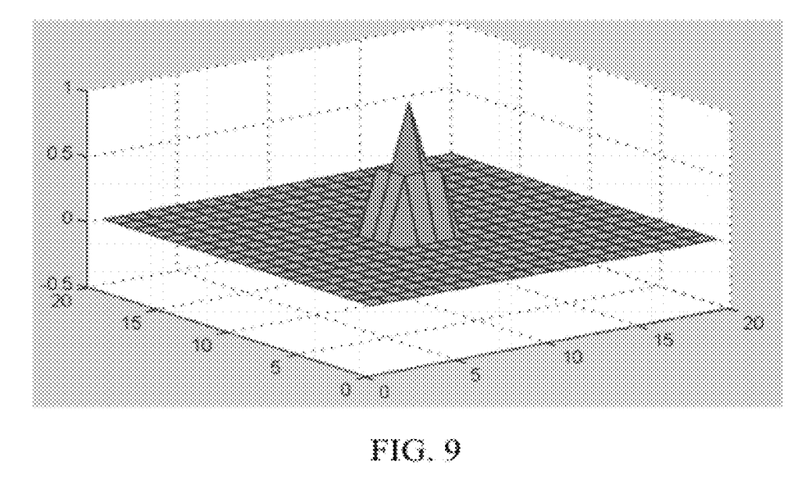
FIG. 9 is the map of the sample-surface portion of FIG. 7 obtained applying the adaptive algorithm of the invention.

The efficiency of the new adaptive algorithm was tested by measuring in simulation a defect with a width corresponding to 5×5 CCD-camera pixels in a flat surface, as illustrated in FIG. 7. The size and shape of the defect was chosen to be representative of the defects normally found in the type of samples for which this invention was developed. The flat surface containing the defect was tilted such that the pixel separation corresponded to an angular frequency of 55 degrees. Groups of eight pixels from the simulated image were processed using both a standard 8-point algorithm known in the literature (specifically, the Schmit and Creath algorithm referenced above) and the new adaptive 8-points algorithm described above. The result produced by the invention is shown in FIG. 9.

Figure 8:
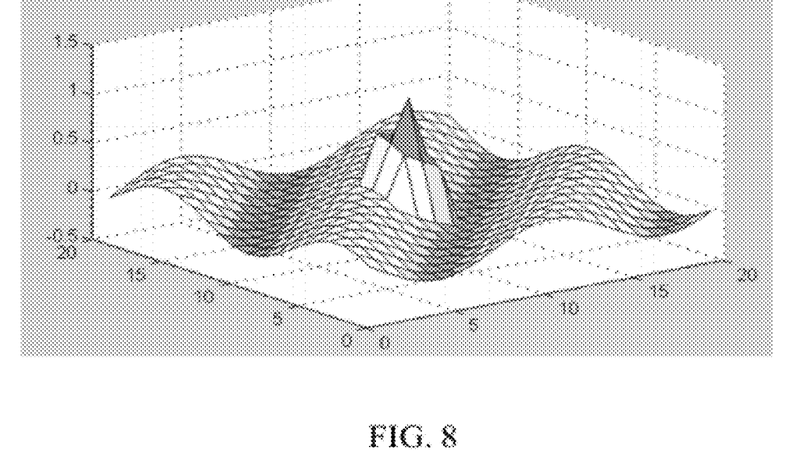
FIG. 8 is the height map of the portion of sample surface of FIG. 7 calculated using a conventional 8-point PSI algorithm with the single-frame spatial-carrier data produced by the sample.

These figures show clearly that the new adaptive algorithm of the invention is capable of recovering the defect shape and size almost exactly under conditions where a conventional counterpart algorithm optimized for the overall tilt of the object introduced print-through (the artifact waviness) and produced an incorrect defect measurement that could have resulted in a defect mischaracterization for the purpose of distinguishing between intrinsic and extrinsic defects for further processing. Thus, the test showed that the adaptive algorithm of the invention is suitable for the low-resolution, fast-acquisition approach of defect identification using spatial-carrier single frame interferometry.

In practice, it is expected that an entire large sample (a flat plastic panel 600×600 mm²) will be scanned in serpentine fashion with a 5× objective and a field of view 1.27×0.96 mm² at a speed of 0.25 sec per measurement, which would produce the acquisition of 300×400 images over a period of about 30 minutes. The object panel will be tilted so as to produce an average spatial fringe frequency corresponding to the number of linear detector pixels per fringe required for optimal performance of the chosen algorithm. According to the technique of the invention, as the algorithm sequentially processes sets of N data points acquired during the scan, each set is first processed with a Fourier Transform module to calculate the fringe frequency corresponding to those points. The frequency information is then fed to the adaptive algorithm of the invention to provide an optimal set of parameters for the algorithm to be used in processing that set of N data points under consideration. The same procedure is repeated at each step as the N set of data points is renewed while the data processing progressed through the entire area of the sample surface. If the resulting profile shows a defect requiring more precise measurement, the sample is then measured again locally with conventional Z-scan PSI at 50× magnification to produce an accurate profile of the defect area.

At the frame rate available for the measurement (0.016 seconds per frame, using a Wyko® SP9900 profiler), the single-frame measurement of the entire panel will take about 30 minutes, which will be sufficient to identify and re-measure the defects by virtue of the improved accuracy provided by the adaptive algorithm of the invention. By comparison, a measurement of the same panel using conventional Z-scan PSI throughout would require approximately 500 minutes, which illustrates the significant improvement in the art provided by the invention.

While the invention has been shown and described herein in what is believed to be the most practical and preferred embodiments, it is recognized that departures can be made therefrom within the scope of the invention. For example, the higher-magnification measurement of defects identified according to the invention is described as being preferably performed by conventional PSI; however, one skilled in the art will readily recognize that VSI may be more appropriate when the defect includes a large step. Similarly, the fringe frequency calculation may be carried out with a Fourier Transform technique as well as with other methods known in the art, such as wavelet transforms, fringe counting, phase-shifting step calculation, or various spectral methods (such as MUSIC™ or ESPRIT®). Similarly, one skilled in the art will readily recognize that fringe frequency can be measured with different but related concepts, such as pixels per cycle (i.e., one over frequency). Therefore, the term frequency as used herein is intended to cover any quantity related to fringe frequency that would enable the practice of this invention with appropriate modifications to the equations described above.

Finally, the invention has been described only with reference to spatial-carrier frequency analysis because it was developed to enable fast defect identification in large samples with single-image data. However, one skilled in the art would readily recognize that it is applicable as well to special situations of temporal-carrier frequency interferometry. For example, when conventional PSI is used to measure object deformations, as described in co-owned U.S. Pat. No. 7,283,250, the adaptive algorithm of the invention could be used advantageously to conform the PSI algorithm to the actual phase step produced by the object's deformation during the scan. Therefore, the invention is not to be limited to the details disclosed herein but is to be accorded the full scope of the claims so as to embrace any and all equivalent processes and products.

The invention claimed is:

1. An interferometric method for profiling a sample surface with single-frame irradiance measurements and a predetermined processing algorithm, the method comprising the following steps:
   acquiring an interferogram from the sample surface;
   calculating a current fringe frequency from a set of interferogram data points;
   modifying the processing algorithm to obtain an adapted algorithm conforming to the current fringe frequency of said set of interferogram data points based on said calculating step; and
   determining a phase corresponding to the set of interferogram data points using the adapted algorithm;
   wherein said acquiring step is carried out with fringe-creating apparatus and said calculating, modifying and determining steps are carried out with a computer processor.

2. The method of claim 1, wherein said processing algorithm is a phase-shifting algorithm.

3. The method of claim 1, wherein said calculating step is carried out with a Fourier Transform technique.

4. The method of claim 1, wherein said processing algorithm is formulated in terms of equations relating a set of coefficients to fringe frequency; said step of modifying the process algorithm is carried out by finding values for said set of coefficients that satisfy the equations when the fringe frequency is equal to said current fringe frequency; and said step of determining a phase is carried out with an arctangent function expressed in terms of said values for the set of coefficients and said irradiance measurements.

5. The method of claim 4, wherein said arctangent function is $$\varphi = \mp \arg\left[\sum_n (a[n] + ib[n])\exp(\mp i2\pi Fn)I[n]\right],$$

wherein F is fringe frequency; I[n] is irradiance registered at pixel n; n is a pixel index in a number N of consecutive image pixels being processed by the algorithm, $1 \leq n \leq N$; and the coefficients a[n] and b[n] are calculated from the system of equations:

$$\begin{cases} \sum_n a[n]\cos(2\pi Fn) \pm b[n]\sin(2\pi Fn) = 0 \\ \sum_n a[n]\sin(2\pi Fn) \mp b[n]\cos(2\pi Fn) = 0 \\ \sum_n a[n]n^k = 0 & k = 0, 1 \ldots \\ \sum_n b[n]n^k = 0 & k = 0, 1 \ldots \end{cases}$$

where k is selected so as to produce a total number of said equations that is not larger than the number of said set of coefficients.

6. The method of claim 5, wherein N=5 and the coefficients a[n] and b[n] are calculated from the system of equations:

$$\begin{cases} a[0] = 1 \\ a[-1] = a[1] = \dfrac{-1 - \cos(2\pi F)}{1 + 2\cos(2\pi F)} \\ a[-2] = a[2] = \dfrac{1}{2[1 + 2\cos(2\pi F)]} \\ b[-2] = b[-1] = b[0] = b[1] = b[2] = 0. \end{cases}$$

7. The method of claim 5, wherein N=6 and the coefficients a[n] and b[n] are calculated from the system of equations:

$$\begin{cases} a\left[-\dfrac{5}{2}\right] = -a\left[\dfrac{5}{2}\right] = 1 \\ a\left[-\dfrac{3}{2}\right] = -a\left[\dfrac{3}{2}\right] = -3 - 2\cos(2\pi F) \\ a\left[-\dfrac{1}{2}\right] = -a\left[\dfrac{1}{2}\right] = 2[2 + 3\cos(2\pi F)] \\ b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = b\left[\dfrac{5}{2}\right] = 0. \end{cases}$$

8. The method of claim 5, wherein N=7 and the coefficients a[n] and b[n] are calculated from the system of equations:

$$\begin{cases} a[-3] = a[3] = 1 \\ a[-2] = a[2] = -2[2 + \cos(2\pi F)] \\ a[-1] = a[1] = 7 + 8\cos(2\pi F) \\ a[0] = -4[2 + 3\cos(2\pi F)] \\ b[-3] = b[-2] = b[-1] = b[0] = b[1] = b[2] = b[3] = 0. \end{cases}$$

9. The method of claim 5, wherein N=8 and the coefficients a[n] and b[n] are calculated from the system of equations:

$$\begin{cases} a\left[-\dfrac{7}{2}\right] = -a\left[\dfrac{7}{2}\right] = -1 \\ a\left[-\dfrac{5}{2}\right] = -a\left[\dfrac{5}{2}\right] = 5 + 2\cos(2\pi F) \\ a\left[-\dfrac{3}{2}\right] = -a\left[\dfrac{3}{2}\right] = -11 - 10\cos(2\pi F) \\ a\left[-\dfrac{1}{2}\right] = -a\left[\dfrac{1}{2}\right] = 5[3 + 4\cos(2\pi F)] \\ b\left[-\dfrac{7}{2}\right] = b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = \\ b\left[\dfrac{5}{2}\right] = b\left[\dfrac{7}{2}\right] = 0. \end{cases}$$

10. The method of claim 1, further including the step of processsing the interferogram to produce a profile of the sample surface by repeating said calculating, modifying and determining steps for successive sets of interferogram data points.

11. An interferometric method for detecting defects in a sample surface comprising the following steps:
   acquiring single-frame spatial-carrier interferogram data from the sample surface;
   selecting a processing algorithm for profiling the sample surface based on a predetermined expected size of the defects;
   calculating a spatial fringe frequency from a set of said interferogram data;
   modifying the processing algorithm to obtain an adapted algorithm conforming to the spatial fringe frequency of said set of interferogram data based on the spatial fringe frequency so calculated; and
   processing the interferogram data to produce a profile of the sample surface by repeating said calculating and modifying steps for successive sets of interferogram data;
   wherein said acquiring step is carried out with fringe-creating apparatus and said calculating, modifying and processing steps are carried out with a computer processor.

12. The method of claim 11, wherein said processing algorithm is a phase-shifting algorithm.

13. The method of claim 11, wherein said calculating step is carried out with a Fourier Transform technique.

14. The method of claim 11, wherein said processing algorithm is formulated in terms of equations relating a set of coefficients to fringe frequency; said step of modifying the process algorithm is carried out by finding values for said set of coefficients that satisfy the equations when the fringe frequency is equal to said spatial fringe frequency; and said step of processing the interferogram data is carried out with an arctangent function expressed in terms of said values for the set of coefficients and irradiance measurements corresponding to said spatial fringe frequency.

15. The method of claim 14, wherein said arctangent function is $$\varphi = \mp \arg\left[\sum_n (a[n] + ib[n])\exp(\mp i2\pi Fn)I[n]\right],$$

wherein F is fringe frequency; $I_n$ is irradiance registered at pixel n; n is a pixel index in a number N of consecutive image pixels being processed by the algorithm, $1 \leq n \leq N$; and the coefficients a[n] and b[n] are calculated from the system of equations:

$$\begin{cases} \sum_n a[n]\cos(2\pi Fn) \pm b[n]\sin(2\pi Fn) = 0 \\ \sum_n a[n]\sin(2\pi Fn) \mp b[n]\cos(2\pi Fn) = 0 \\ \sum_n a[n]n^k = 0 & k = 0, 1 \ldots \\ \sum_n b[n]n^k = 0 & k = 0, 1 \ldots \end{cases}$$

where k is selected so as to produce a total number of said equations that is not larger than the number of said set of coefficients.

16. A method of adapting an interferometric processing algorithm to a local fringe frequency of an interferogram, the method comprising the following steps:
  formulating the algorithm in terms of equations relating a set of coefficients to fringe frequency;
  finding values for said set of coefficients that satisfy the equations when the fringe frequency is equal to said local fringe frequency;
  determining a phase with an arctangent function expressed in terms of said values for the set of coefficients and irradiance measurements corresponding to said local fringe frequency; and
  repeating the step of finding values for the set of coefficients and the step of determining a phase for successive local fringe frequencies of the interferogram;
  wherein said finding and determining steps are carried out with a computer processor.

17. The method of claim 16, wherein said arctangent function is $$\varphi = \mp \arg\left[\sum_n (a[n] + ib[n])\exp(\mp i2\pi Fn)I[n]\right],$$

wherein F is fringe frequency; $I_n$ is irradiance registered at pixel n; n is a pixel index in a number N of consecutive image pixels being processed by the algorithm, $1 \leq n \leq N$; and the coefficients a[n] and b[n] are calculated from the system of equations:

$$\begin{cases} \sum_n a[n]\cos(2\pi Fn) \pm b[n]\sin(2\pi Fn) = 0 \\ \sum_n a[n]\sin(2\pi Fn) \mp b[n]\cos(2\pi Fn) = 0 \\ \sum_n a[n]n^k = 0 & k = 0, 1 \ldots \\ \sum_n b[n]n^k = 0 & k = 0, 1 \ldots \end{cases}$$

where k is selected so as to produce a total number of said equations that is not larger than the number of said set of coefficients.

18. The method of claim 17, wherein N=5 and the coefficients a[n] and b[n] are calculated from the system of equations:

$$\begin{cases} a[0] = 1 \\ a[-1] = a[1] = \dfrac{-1 - \cos(2\pi F)}{1 + 2\cos(2\pi F)} \\ a[-2] = a[2] = \dfrac{1}{2[1 + 2\cos(2\pi F)]} \\ b[-2] = b[-1] = b[0] = b[1] = b[2] = 0. \end{cases}$$

19. The method of claim 17, wherein N=6 and the coefficients a[n] and b[n] are calculated from the system of equations:

$$\begin{cases} a\left[-\dfrac{5}{2}\right] = -a\left[\dfrac{5}{2}\right] = 1 \\ a\left[-\dfrac{3}{2}\right] = -a\left[\dfrac{3}{2}\right] = -3 - 2\cos(2\pi F) \\ a\left[-\dfrac{1}{2}\right] = -a\left[\dfrac{1}{2}\right] = 2[2 + 3\cos(2\pi F)] \\ b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = b\left[\dfrac{5}{2}\right] = 0. \end{cases}$$

20. The method of claim 17, wherein N=7 and the coefficients a[n] and b[n] are calculated from the system of equations:

$$\begin{cases} a[-3] = a[3] = 1 \\ a[-2] = a[2] = -2[2 + \cos(2\pi F)] \\ a[-1] = a[1] = 7 + 8\cos(2\pi F) \\ a[0] = -4[2 + 3\cos(2\pi F)] \\ b[-3] = b[-2] = b[-1] = b[0] = b[1] = b[2] = b[3] = 0. \end{cases}$$

21. The method of claim 17, wherein N=8 and the coefficients a[n] and b[n] are calculated from the system of equations:

$$\begin{cases} a\left[-\dfrac{7}{2}\right] = -a\left[\dfrac{7}{2}\right] = -1 \\ a\left[-\dfrac{5}{2}\right] = -a\left[\dfrac{5}{2}\right] = 5 + 2\cos(2\pi F) \\ a\left[-\dfrac{3}{2}\right] = -a\left[\dfrac{3}{2}\right] = -11 - 10\cos(2\pi F) \\ a\left[-\dfrac{1}{2}\right] = -a\left[\dfrac{1}{2}\right] = 5[3 + 4\cos(2\pi F)] \\ b\left[-\dfrac{7}{2}\right] = b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = \\ b\left[\dfrac{5}{2}\right] = b\left[\dfrac{7}{2}\right] = 0. \end{cases}$$

22. Interferometric apparatus for profiling a sample surface with single-frame spatial-carrier irradiance measurements and a predetermined processing algorithm, comprising:
  means for acquiring an interferogram from the sample surface;
  means for calculating a fringe frequency in said interferogram;

means for modifying the processing algorithm to obtain an adapted algorithm conforming to the fringe frequency so calculated;
means for determining a phase of irradiance data corresponding to said fringe frequency in the interferogram using the adapted algorithm; and
means for processing the interferogram to produce a profile of the sample surface by repeating said calculating, modifying and determining steps for successive sets of irradiance data.

23. The apparatus of claim 22, wherein said means for acquiring an interferogram from the sample surface includes means for introducing a predetermined angle between the sample surface and a reference mirror.

24. Non-transitory computer readable medium containing computer instructions stored therein for causing a computer processor to acquire an interferogram from a sample surface, calculate a fringe frequency in said interferogram, modify the processing algorithm to obtain an adapted algorithm conforming to the fringe frequency so calculated, and process the interferogram to produce a profile of the sample surface.

25. Non-transitory computer readable medium containing computer instructions stored therein for causing a computer processor to modify a processing algorithm formulated in terms of equations relating a set of coefficients to a fringe frequency in an interferogram, said computer readable medium being programmed to find values for said set of coefficients that satisfy the equations when the fringe frequency is equal to a local fringe frequency in the interferogram, and to determine a phase with an arctangent function expressed in terms of said values for the set of coefficients and irradiance measurements corresponding to said local fringe frequency.

26. The non-transitory computer readable medium of claim 25, wherein said arctangent function is $$\varphi = \mp \arg\left[\sum_n (a[n] + ib[n])\exp(\mp i2\pi Fn)I[n]\right],$$

wherein F is fringe frequency; I[n] is irradiance registered at pixel n; n is a pixel index in a number N of consecutive image pixels being processed by the algorithm, $1 \leq n \leq N$; and the coefficients a[n] and b[n] are calculated from the system of equations:

$$\begin{cases} \sum_n a[n]\cos(2\pi Fn) \pm b[n]\sin(2\pi Fn) = 0 \\ \sum_n a[n]\sin(2\pi Fn) \mp b[n]\cos(2\pi Fn) = 0 \\ \sum_n a[n]n^k = 0 & k = 0, 1 \ldots \\ \sum_n b[n]n^k = 0 & k = 0, 1 \ldots \end{cases}$$

where k is selected so as to produce a total number of said equations that is not larger than the number of said set of coefficients.

27. The non-transitory computer readable medium of claim 26, wherein N=5 and the coefficients a[n] and b[n] are calculated from the system of equations:

$$\begin{cases} a[0] = 1 \\ a[-1] = a[1] = \dfrac{-1 - \cos(2\pi F)}{1 + 2\cos(2\pi F)} \\ a[-2] = a[2] = \dfrac{1}{2[1 + 2\cos(2\pi F)]} \\ b[-2] = b[-1] = b[0] = b[1] = b[2] = 0. \end{cases}$$

28. The non-transitory computer readable medium of claim 26, wherein N=6 and the coefficients a[n] and b[n] are calculated from the system of equations:

$$\begin{cases} a\left[-\dfrac{5}{2}\right] = -a\left[\dfrac{5}{2}\right] = 1 \\ a\left[-\dfrac{3}{2}\right] = -a\left[\dfrac{3}{2}\right] = -3 - 2\cos(2\pi F) \\ a\left[-\dfrac{1}{2}\right] = -a\left[\dfrac{1}{2}\right] = 2[2 + 3\cos(2\pi F)] \\ b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = b\left[\dfrac{5}{2}\right] = 0. \end{cases}$$

29. The non-transitory computer readable medium of claim 26, wherein N=7 and the coefficients a[n] and b[n] are calculated from the system of equations:

$$\begin{cases} a[-3] = a[3] = 1 \\ a[-2] = a[2] = -2[2 + \cos(2\pi F)] \\ a[-1] = a[1] = 7 + 8\cos(2\pi F) \\ a[0] = -4[2 + 3\cos(2\pi F)] \\ b[-3] = b[-2] = b[-1] = b[0] = b[1] = b[2] = b[3] = 0. \end{cases}$$

30. The non-transitory computer readable medium of claim 26, wherein N=8 and the coefficients a[n] and b[n] are calculated from the system of equations:

$$\begin{cases} a\left[-\dfrac{7}{2}\right] = -a\left[\dfrac{7}{2}\right] = -1 \\ a\left[-\dfrac{5}{2}\right] = -a\left[\dfrac{5}{2}\right] = 5 + 2\cos(2\pi F) \\ a\left[-\dfrac{3}{2}\right] = -a\left[\dfrac{3}{2}\right] = -11 - 10\cos(2\pi F) \\ a\left[-\dfrac{1}{2}\right] = -a\left[\dfrac{1}{2}\right] = 5[3 + 4\cos(2\pi F)] \\ b\left[-\dfrac{7}{2}\right] = b\left[-\dfrac{5}{2}\right] = b\left[-\dfrac{3}{2}\right] = b\left[-\dfrac{1}{2}\right] = b\left[\dfrac{1}{2}\right] = b\left[\dfrac{3}{2}\right] = b\left[\dfrac{5}{2}\right] = \\ b\left[\dfrac{7}{2}\right] = 0. \end{cases}$$

* * * * *